United States Patent [19]

Hetzer

[11] 4,130,745
[45] Dec. 19, 1978

[54] DIFFERENTIAL PRESSURE THRESHOLD DETECTOR

[75] Inventor: Fritz Hetzer, Isny, Germany
[73] Assignee: Purolator Filter G.m.b.H., Germany
[21] Appl. No.: 828,169
[22] Filed: Aug. 23, 1977
[30] Foreign Application Priority Data
Sep. 9, 1976 [DE] Fed. Rep. of Germany ....... 2640529
[51] Int. Cl.² .......................................... H01H 35/38
[52] U.S. Cl. .................. 200/82 E; 335/205;
73/194 E
[58] Field of Search .................. 73/194 E, 744, 745,
73/753; 335/153, 205, 206, 207; 200/82 E, 81
R, 82 R; 340/240

[56] References Cited
U.S. PATENT DOCUMENTS 3,538,274  11/1970  Gfeller ................. 200/82 E
4,039,985   8/1977  Shlesinger, Jr. ............ 335/153

OTHER PUBLICATIONS

Multiconfiguration Pressure Switch, Bolan, IBM Tech. Discl. Bull, vol. 8, No. 7, Dec. 1965, p. 954.

Primary Examiner—Gerald P. Tolin
Attorney, Agent, or Firm—William Anthony Drucker

[57] ABSTRACT

A differential pressure threshold detector in which a reed switch is arranged eccentrically in a housing which can be mounted on a housing containing an axially movable control magnet in either of two positions so that the axes of the reeds lie substantially parallel to the axial path of the magnet and in one position movement of the magnet acts to close the switch whereas in the other position movement of the magnet acts to open the switch.

2 Claims, 1 Drawing Figure

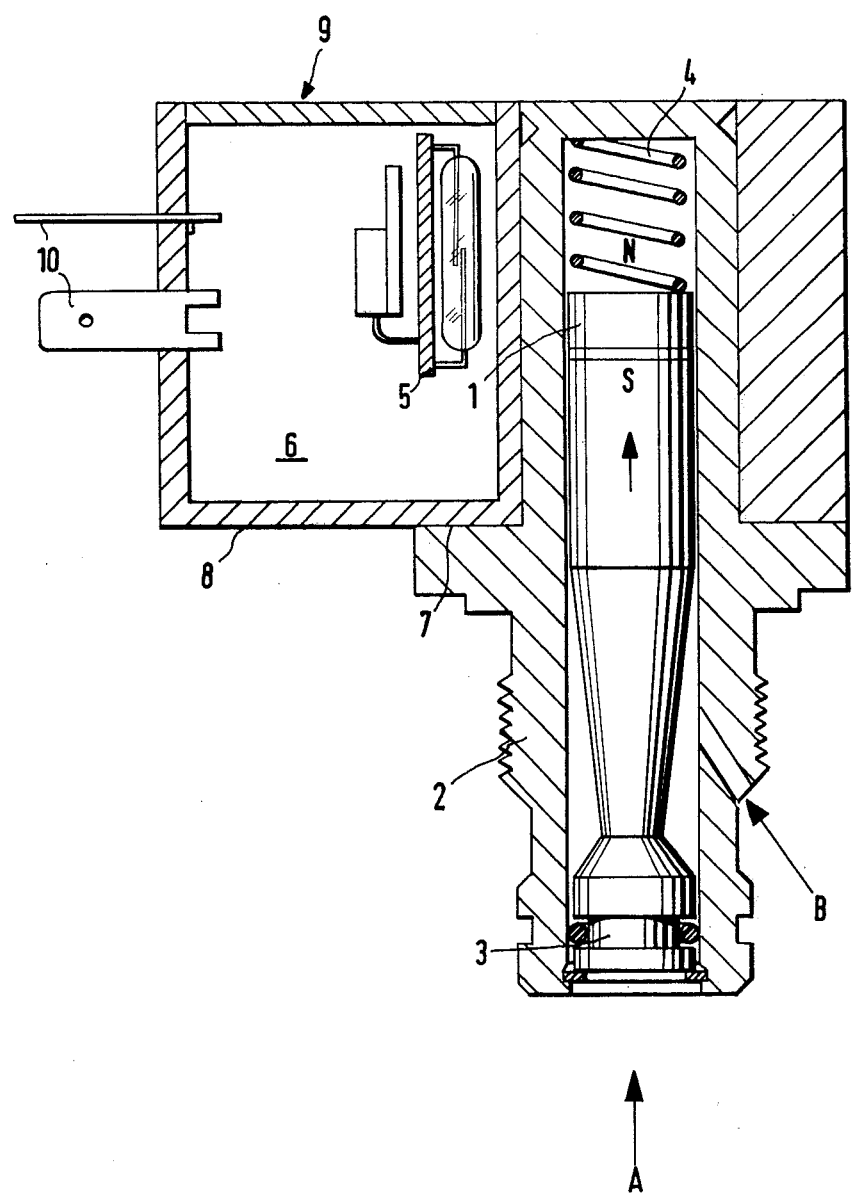

DIFFERENTIAL PRESSURE THRESHOLD DETECTOR

BACKGROUND TO THE INVENTION

The invention relates to a differential pressure threshold detector, having a control magnet and a reed switch actuated thereby, said switch having two contact reeds.

According to the position of the reed switch in relation to the control magnet, the reed switch on movement of the control magnet opens or closes an electric actuation circuit.

The function of the reed switch as actuation circuit opener or closer is determined generally by the assembling of the other electric monitor and regulator devices to which the differential pressure detector is connected. Thus in practice on one occasion the one function and on another the other is required. For the detector this signifies that according to need detectors must be equipped with different reed switches. Frequently the assembly of the electric monitor installation to which the detector is to be connected is not known, not yet known or not correctly known, with the consequence that detectors are available which are of the wrong kind and therefore are not usable. The reed switches cannot moreover be simply exchanged by the user of the detector, since they are an integral part of the entire detector. Thus in fact the entire detector must be replaced. Since as a rule the manufacturer and the user of the detector are not identical, such an exchange usually involves considerable expense.

OBJECT OF THE INVENTION

The invention is therefore based upon the problem of producing a differential pressure threshold detector with a reed switch, in which the position of the reed switch in relation to the control magnet can be altered in a simple and reliable manner so that the reed switch works either as opener or as closer.

SUMMARY OF THE INVENTION

According to the invention there is provided a differential pressure threshold detector comprising a control magnet and a reed switch actuated thereby having two contact reeds, characterised by the features of a first housing, a reed switch mounted within said housing, a second housing, a portion of which is formed as a guide capable of entering an aperture in the first housing when the latter is pushed onto said guide, a stop element in said second housing for locating the first housing on said second housing in a predetermined position, and a control magnet for said reed switch movable along a displacement path within said second housing in dependence upon a differential pressure applied to said magnet, the axis of said displacement path being parallel to a plane containing the axis of said reeds, said first housing containing the reed switch being pushable on to the guide of the second housing according to choice in one of two positions turned through 180° about an axis lying perpendicularly of the axis of the displacement path, said reed switch being disposed in relation to the axial dimension of the first housing, eccentrically therein in such a way that the mode of operation of the reed switch as an off-on switch or an on-off switch is determinable by the selection of said positions.

In order to increase the response accuracy of the reed switch it is expedient to position the reeds so that the axis of the reeds of the reed switch lie in a plane parallel with the plane containing the axis of the control magnet, and is inclined to the axis of the control magnet.

It is an essential advantage of the differential pressure detector assembled according to the invention that only two exactly defined positions for the reed switch in relation to the housing of the control magnet are possible. These two positions here determine the function of the reed switch as opener or closer for an electric actuation circuit. The determination of function for the reed switch is as simple and reliable as can be conceived, since the part which accommodates the reed switch needs only simply to be turned round for a desired change of function. Thus especially intermediate positions with a modified response behaviour of the reed switch are made impossible. This is very important for practical use, since in this way operating errors are practically excluded from the outset. Thus an increase of operational reliability is thereby achieved with simple means.

BRIEF DESCRIPTION OF DRAWING

The accompany drawing shows a differential pressure detector in the invention in longitudinal section.

DESCRIPTION OF PREFERRED EMBODIMENT

A control magnet 1 is guided in a guide housing 2. The higher pressure is applied in the direction of the arrow A and the lower pressure in the direction of the arrow B to the piston 3. On the lower pressure side of the piston 3 the spring 4 provides the desired moment of actuation threshold. The component 6 containing the reed switch 5 is pushed on to the upper part of the guide housing 2. The component 6 can rest on the carrier part 7 of the guide housing 2 either with its surface 8 or with its surface 9. The axis of the reeds of the switch 5 is disposed in a plane parallel to a plane containing the axis of the path of movement of the piston 3. In relation to the height of the component 6 lying in the direction of the displacement path of the control magnet 1 the reed switch is installed eccentrically in the component 6. The connection of the reed switch 5 is possible through the component 6 with the aid of a plug 10.

The manner of operation of the detector is as follows:

When a specific pressure difference is exceeded the piston with control magnet moves upwards in the direction of the arrow A. The magnetic field of the control magnet 1 thus changes its position in relation to the reed switch 5 and effects an opening or closure of its reed contacts. Whether the reed contact here serves as opener (off-on switch) or closer (on-off switch) is dependent here exclusively upon its position in relation to the guide housing 2. In the variant as illustrated the reed switch 5 acts as closer, for the magnetic field of the control magnet 1 affects only the lower reed of the reed switch, namely in such a way that no magnetic pole can develop there. If now the control magnet 1 however moves in the direction towards the spring 4, the magnetic field issuing from it simultaneously affects the upper and lower reeds of the reed switch. The reeds are thus polarised and attract one another, so that the contact is closed in this way.

Use of the same reed switch 5 in the same component 6 as opening switch can now be achieved quite simply by rotation of the component 6 through 180° about its central axis perpendicular to the displacement path of the control magnet 1. Thus then the component 6 rests with its support face 9 on the carrier part 7 of the guide housing. When the component 6 is in this position the reed switch lies with its actuator reeds, in the case of a still permissible pressure difference, in the magnetic field of the control magnet 1 in such a way that the reeds are mutually attracted, that is the contact is closed. If now on exceeding of a specific pressure difference the piston with control magnet 1 again moves upwards in the direction of the arrow A, the magnetic field of the control magnet 1 after a specific value of the displacement path affects only the upper reed of the reed contact, again in such a way that no pole development occurs there, with the consequence that the reeds no longer attract one another, that is the contact opens.

The response behaviour of the reed switch is especially affected by the fact that the axis of the reeds is inclined in relation to the axis of the displacement path of the control magnet 1 when viewing the arrangement in a direction axially of the plug 10.

The essential advantage of the invention consists in that the function of the reed switch 5 as opener or closer can be achieved by simple rotation of the component 6 through 180°. Thus using a simple two-reed, quick-responding, small reed switch without additional expenditure for constructional circuitry, differential pressure detector can be made available of which the electric switch can operate either in the opening or in the closing mode.

I claim:

1. A differential pressure threshold detector comprising a control magent and a reed switch actuated thereby having two contact reeds, characterised by the features:
   (a) a first housing,
   (b) a reed switch mounted within said housing,
   (c) a second housing, a portion of which is formed as a guide capable of entering an aperture in the first housing when the latter is pushed onto said guide,
   (d) a stop element in said second housing for locating the first housing on said second housing in a predetermined position, and
   (e) a control magnet for said reed switch movable along a displacement path within said second housing in dependence upon a differential pressure applied to said magnet, the axis of said displacement path being parallel to a plane containing the axis of said reeds,
   (f) said first housing containing the reed switch being pushable on to the guide of the second housing according to choice in one of two positions turned through 180° about an axis lying perpendicularly of the axis of the displacement path,
   (g) said reed switch being disposed in relation to the axial dimension of the first housing, eccentrically therein in such a way that the mode of operation of the reed switch as an off-on switch or an on-off switch is determinable by the selection of said positions.

2. A differential pressure detector according to claim 1, wherein the axis of the reeds is inclined within the plane containing it, to the axis of the displacement path of the magnet.

* * * * *